July 16, 1963     P. M. PITTS, JR., ET AL     3,097,925
METHOD OF RECOVERING SULFUR
Filed April 17, 1958
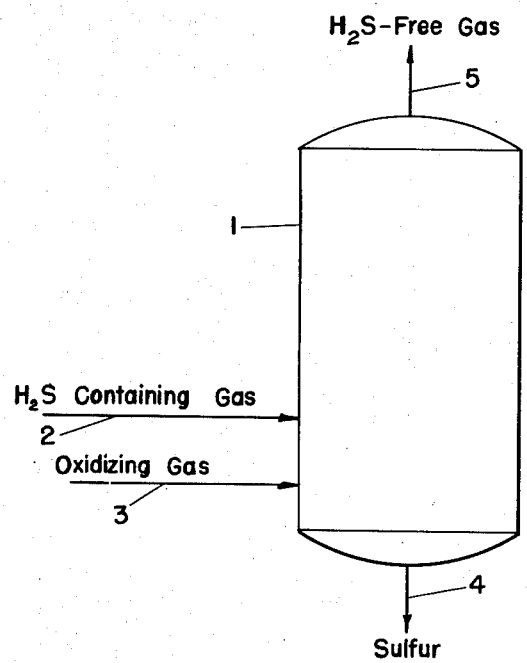
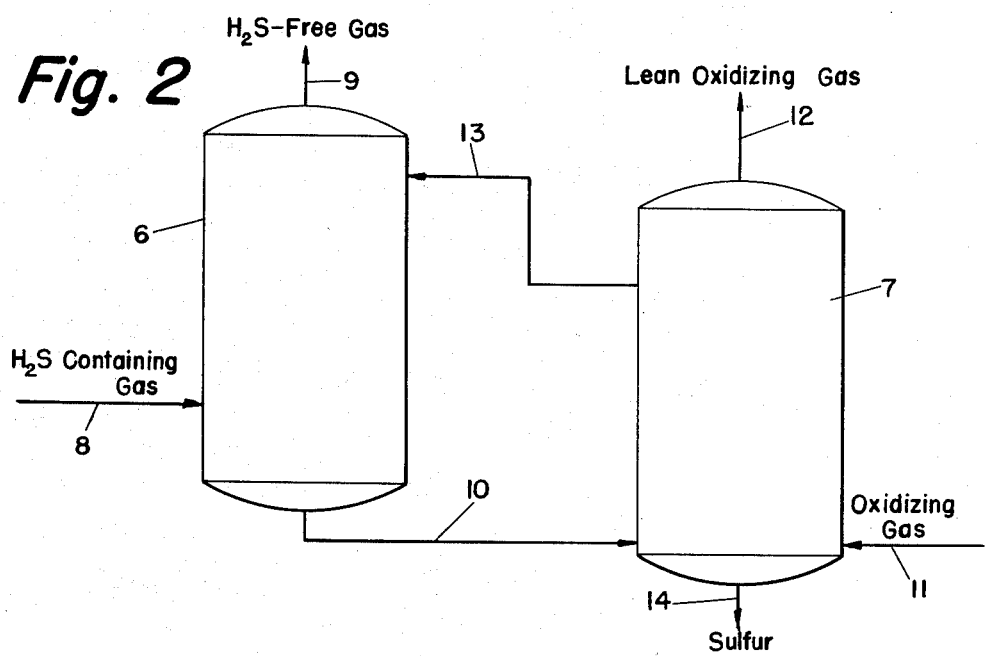
INVENTORS
PAUL M. PITTS, JR.
ROBERT W. RIEVE
BY Norbert E. Birch
ATTORNEY

United States Patent Office 3,097,925
Patented July 16, 1963

3,097,925
METHOD OF RECOVERING SULPHUR
Paul M. Pitts, Jr., Media, and Robert W. Rieve, Drexel Hill, Pa., assignors to The Atlantic Refining Company, Philadelphia, Pa., a corporation of Pennsylvania
Filed Apr. 17, 1958, Ser. No. 729,184
1 Claim. (Cl. 23—225)

This invention relates to a process for the removal of hydrogen sulfide from hydrogen sulfide-containing gas streams and the recovery of sulfur therefrom. More particularly this invention relates to a continuous process for the direct conversion of hydrogen sulfide contained in gaseous hydrocarbon streams to elemental sulfur in an oxidation-reduction system utilizing a polyvalent metallic ion-chelate complex solution wherein the reduced cation is regenerated to the higher valence state with a free-oxygen containing gas.

Increased hydrotreating of refinery streams, by means of such processes as reforming, hydrodesulfurization and hydrogenation has augmented the production of hydrogen sulfide as a by-product and heightened the disposal problem of this air pollutant as well as intensified the search for an efficient and economic process for recovering sulfur therefrom.

The reaction of hydrogen sulfide with basic compounds to form salts has served as the basis for most processes heretofore employed for the removal of hydrogen sulfide from gaseous hydrocarbon streams. Such bases as sodium hydroxide, sodium carbonate, lime, dolomite, iron oxide, potassium phosphate in basic solution, and amine solutions of the ethanolamine type have been used. Each of the metallic bases react with the hydrogen sulfide to yield the corresponding metal sulfide and water. The amine solutions of the ethanolamine type react with hydrogen sulfide to produce an amine sulfide or hydrosulfide salt in solution. The amine salt solutions are then stripped in external equipment to regenerate the ethanolamine and evolve hydrogen sulfide. In some cases this relatively pure hydrogen sulfide obtained from an ethanolamine process or a phosphate process is passed to a sulfur recovery plant which oxidizes a portion of the hydrogen sulfide to sulfur dioxide and reacts the remaining hydrogen sulfide with the sulfur dioxide to form elemental sulfur. This results in about 90 percent recovery of the sulfur. In other cases the hydrogen sulfide separated from hydrocarbon streams is utilized by the refiner as a fuel or is discarded.

Each of the above enumerated processes for both hydrogen sulfide removal and sulfur recovery is subject to serious limitations. The hydrogen sulfide is converted to spent metal sulfides in the processes which utilize the oxides, hydroxides and carbonates. These sulfides are generally discarded because of difficulties in regenerating them to their original form. The amine type solutions such as ethanolamine are weak bases and, unlike the inorganic bases, do not remove the hydrogen sulfide completely. Furthermore the hydrogen sulfide from the phosphate or amine solution processes requires further treatment in a sulfur recovery process wherein a portion is burned to sulfur dioxide and reacted with the remainder to form sulfur. This process is difficult to control because of the need for exact regulation of gas velocities and concentrations. In addition, the gases handled under its operating conditions present a corrosion problem and the product sulfur is usually contaminated with carbon due to small amounts of hydrocarbons included in the hydrogen sulfide.

It is therefore an object of this invention to provide a method for the substantially complete removal of hydrogen sulfide from gaseous hydrocarbon streams.

It is another object of this invention to provide a method for the direct conversion of hydrogen sulfide in gaseous hydrocarbon streams to sulfur.

It is another object of this invention to provide a single continuous process for the removal of hydrogen sulfide from gaseous hydrocarbon streams and its direct conversion to elemental sulfur.

It is another object of this invention to provide a method whereby substantially complete recovery of a high purity sulfur from hydrogen sulfide may be accomplished.

Other objects and advantages will be apparent from a reading of the specification and the appended claim.

It has now been discovered that hydrogen sulfide contained in gaseous hydrocarbon streams may be converted directly to elemental sulfur by utilizing an oxidation-reduction system comprising a polyvalent metallic ion-chelate complex solution wherein the hydrogen sulfide is oxidized to sulfur and the reduced metallic cation is oxidized to its original valence state by a free-oxygen containing gas. The regeneration of the reduced cation may be performed concurrently with the oxidation of the hydrogen sulfide or it may be performed separately.

It is known that in an oxidation-reduction system, the sulfide ion in hydrogen sulfide is oxidized to sulfur by the oxidizing agent which is in turn reduced. For example, when hydrogen sulfide is placed in contact with a source of the ferric ion or stannic ion, the sulfide ion is oxidized to sulfur and the cation is reduced to the lower valence state, ferrous in the case of iron and stannous in the case of tin. These reactions are instantaneous and complete within stoichiometric requirements of the reactions. Simultaneously with the oxidation of the sulfide ion to sulfur the reaction produces 2 moles of hydrogen ion for each mole of hydrogen sulfide. In addition if the solubility product constant for the sulfide of either valence state of the metal ion is exceeded the sulfide will precipitate. For example, with ferric ion the reaction is as follows:

(1) $\quad 2FeCl_3 + H_2S \rightarrow 2FeCl_2 + S + 2HCl$ and in a basic solution wherein the solubility product of ferrous sulfide is exceeded the reaction becomes (2) $\quad 2FeCl_3 + 3H_2S \rightarrow 2FeS + 6HCl + S$ with precipitation of the ferrous sulfide.

The reduced form of the oxidizing cation may be reoxidized to the higher valence state with air or another suitable oxidizing agent. In this reaction the oxygen of the air reacts to oxidize the lower valence state and is in turn reduced combining with the hydrogen ion in the solution to produce water. An example of this reaction in the case of iron is as follows:

(3) $\quad 4FeCl_2 + 4HCl + O_2 \rightarrow 4FeCl_3 + 2H_2O$

Thus the overall reaction for the combination of the two steps becomes a sum of Reactions 1 and 3 after multiplying Reaction 1 by 2

$$2H_2S + O_2 \rightarrow 2S + 2H_2O$$

The net reaction is a simple oxidation of hydrogen sulfide by oxygen to form sulfur and water. Other materials present would simply pass through the reaction zones and serve merely as diluents except those materials which would be oxidized under the conditions of the operation as hereinafter defined.

Experimentation has shown that the first reaction involving the oxidation of the sulfide ion proceeds almost quantitatively at room temperature and atmospheric pressure. However, the third reaction involving the regeneration of the reduced cation to the higher valence state proceeds slowly even at elevated temperatures. As a result the oxidation of the sulfide ion also proceeds slowly after the stoichiometric amount of hydrogen sulfide has been added.

It has now been discovered that the incorporation of a chelating agent in the oxidation-reduction system which is capable of complexing the cation prevents or retards the precipitation of the metal by the sulfide or hydroxyl ion and increases the rate of oxidation of the reduced cation to the higher valence state, thereby efficiently regenerating the reagent. The chelating agent increases the oxidation potential of the metal and keeps it from precipitating even at high pH values. Under these conditions the regeneration of the cation is much more rapid. Thus, the use of an oxidation-reduction system wherein the metallic cation appears as a coordination complex, such as a chelate, allows both the reaction involving the oxidation of the sulfide ion and the reaction involving the regeneration of the reduced cation to proceed quantitatively and concurrently. The regeneration step may also be performed separately if desired.

In accordance with the instant invention hydrogen sulfide or a hydrogen sulfide-containing gas stream and an oxidizing gas such as air are passed into an aqueous solution containing a polyvalent metal ion in the oxidized form and a chelating agent for the metal. The two gases react within the solution to produce sulfur which may be removed by any suitable means. Since the reaction of oxidation is quantitative the hydrogen sulfide in a gas stream is efficiently removed from the hydrogen sulfide-containing gas to render it free from hydrogen sulfide within the limits of detectability. The diluents in the gases, for example nitrogen in the case of air, will pass through the reactor along with the hydrogen sulfide-free gas.

Where it is desired to keep the diluents out of the effluent gas, a dual reactor system may be employed. In the first reactor the metal complex-containing solution in the oxidized form is reacted with the hydrogen sulfide-containing gas to render it hydrogen sulfide-free and the hydrogen sulfide-free gas is evolved from the reactor. The solution containing sulfur and the metal complex is passed to the second reactor in which an oxidizing gas such as air restores the reduced metal complex-containing solution to the oxidized state. The lean oxidizing gas is evolved from the top of the second reactor and the metal complex-containing solution is recycled to the first reactor for further reaction. The sulfur may be removed from the second reactor by any suitable method.

The chelating agents which may be used in the instant invention in conjunction with polyvalent metallic cations are those which form a complex ion having a small enough instability constant in solution so that the concentration of, or activity of, the metal is insufficient to exceed the solubility product of the metal sulfide or hydroxide. In the instant invention a "chelating agent" refers to a compound that will inactivate a metallic ion by making the metallic ion an integral part of an inner ring structure. These compounds may be of the ethylenediamine tetra-acetic acid type or derivatives thereof or any other substance which will effectively complex the metal ion by forming cyclic structures. For example, the reaction of ferric chloride with ethylenediamine tetra-acetic acid tetra-sodium salt is shown to be as follows:

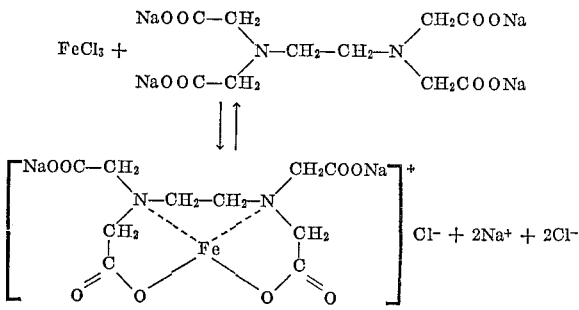

wherein the two coordinate covalent linkages from the two nitrogen atoms to the ferric atom are called chelate bonds. These additional bonds impart stability to the complex and the instability constants are smaller, as a rule, than those of non-chelated complexes. Preferred chelating agents in the instant invention are the Versenes, Sequestrenes, Permakleers and other similar commercial materials.

The metals which may be employed in the instant invention in conjunction with the chelating agents are those polyvalent metals which will oxidize sulfide to sulfur and in turn be reoxidized by oxygen or similar gas. Examples of these metals are iron and tin although other metals may be used with proper adjustment in concentration so that the algebraic sum of the single electrode potentials render the reaction thermodynamically possible. The range of pH operation is between 1 and 13 with the preferred range from above 7 to 10.

Iron-chelate solutions have been found to be particularly effective in the instant invention. Superior results were obtained with ferric chloride or ferric nitrate and "Versene Fe-3 Specific," a commercial chelating agent which is the sodium salt of N,N-dihydroxyethylglycine. It is sold commercially by the Dow Chemical Company as a 47 percent solution in water and has a pH of 11 to 12 and a specific gravity of 1.2.

The metal-chelate solutions are prepared by mixing a solution of a polyvalent metal compound such as ferric chloride or ferric nitrate with a solution of the chelating agent and adjusting the pH with a base such as sodium hydroxide. The concentration of the metal ion in the solution may be any value up to the saturation value for the metal and the complexing agent which is present in stoichiometric amounts. Satisfactory results were obtained with iron in concentrations ranging up to 3 molar.

The temperature and pressure of the system are not to be considered as limiting. Ambient temperatures to temperatures of 500° F. or above may be used with the preferred temperatures ranging from 60° F. to 280° F. The pressure may range from atmospheric to 1000 p.s.i.g. and preferably from atmospheric to 250 p.s.i.g.

The instant invention may be better understood by reference to the accompanying drawings which illustrate two embodiments thereof. FIGURES 1 and 2 illustrate a single reactor process and a dual reactor process, respectively, in diagrammatic form.

Referring to FIGURE 1, an aqueous solution containing a polyvalent metallic cation in the oxidized form and a chelating agent for the metal is charged to reactor 1. A hydrogen sulfide-containing gaseous hydrocarbon stream is passed into reactor 1 by means of line 2. An oxidizing gas, such as air, is passed concurrently into reactor 1 by means of line 3. The gases react to produce elemental sulfur which is removed from the reactor through line 4. The hydrogen sulfide-free gas is removed by means of line 5.

In the dual reactor system shown in FIGURE 2, an aqueous solution containing a polyvalent metallic cation in the oxidized form and a chelating agent for the metal is charged to reactor 6. A hydrogen sulfide-containing gaseous hydrocarbon stream is passed by means of line 8 into reactor 6 where it is rendered hydrogen sulfide-free and passed out of reactor 6 through line 9. The solution containing sulfur and the metal complex is passed from reactor 6 to reactor 7 by means of line 10. An oxidizing gas, such as air, is passed into reactor 7 through line 11 to restore the metal complex-containing solution to the oxidized state. The lean oxidizing gas passes out of reactor 7 through line 12. The oxidized metal complex-containing solution is recycled to reactor 6 by means of line 13. The sulfur is removed from reactor 7 by means of line 14.

The manner of separating the recovered sulfur from the solution will depend to some extent upon the operating conditions within the scope of the instant invention.

For example, operation above the melting point of sulfur will render the sulfur molten and it may be removed as a liquid. At lower temperatures, for example at about the boiling point of water, the sulfur agglomerates as a heavy slurry and the supernatent liquid may be removed by decantation, centrifugation, filtration and the like. At still lower temperatures incorporation of an agent such as a relatively non-volatile alcohol aids agglomeration so that the above mentioned physical means of removal may be employed.

The process of the instant invention may be performed in a continuous system or as a batch process, but a continuous system is preferred.

The following example serves to illustrate the invention but is not intended to limit it thereto:

EXAMPLE I

Various experiments were performed utilizing an oxidation-reduction system for the recovery of sulfur from hydrogen sulfide and hydrogen sulfide-containing gaseous hydrocarbon streams and for the regeneration of the reduced cations. In run No. 1 hydrogen sulfide gas was treated with a ferric chloride solution in the presence of air. In runs Nos. 2, 3, and 4 solutions of ferric chloride were complexed with Versene Fe-3 Specific. Hydrogen sulfide gas was oxidized in the iron-chelate solutions at various pH levels and the reduced cations were regenerated with oxygen. In these runs the oxidation of hydrogen sulfide and the regeneration of the reduced cations were performed concurrently. In runs No. 5-A and 5-B the oxidation of $H_2S$ and the regeneration of the reduced cation were performed in a dual reactor system. In run No. 5-A a gaseous hydrocarbon stream from a catalytic cracking unit containing 63.4 percent $C_3$, 24.0 percent $C_2$, 6.5 percent $C_1$, and 0.2 percent $C_4$ hydrocarbons in mole percent, 4.8 mole percent $H_2S$ (3100 grams $H_2S$/100 cu. ft.), and 1.1 mole percent $CO_2$, was passed into an iron-chelate solution at 100° C. in the absence of oxygen. The iron-chelate solution was prepared by complexing a ferric chloride solution with a solution of Versene Fe-3 Specific and adjusting the pH with NaOH to 7.9. After the stoichiometric amount of $H_2S$ was added the hydrocarbon stream was replaced by air to regenerate the reduced cation to its original valence state. In run No. 6 hydrogen sulfide gas was treated with a solution of Versene Fe-3 Specific alone at a pH of 12.65. In all instances the sulfur was removed by simple filtration. The various operating conditions, the amount of sulfur recovered and the extent of regeneration of the reduced cations are set out in Table I.

Table I

| Run No. | Starting solution | | | Temp. (° C.) | Time (hrs.) | Gas rates | | Final solution | |
|---|---|---|---|---|---|---|---|---|---|
| | Volume (c.c.) | Molarity Fe | pH | | | $H_2S$ (M/hr.) | $O_2$ (M/hr.) | Percent S from $H_2S$ | Percent $Fe^{+3}$ of total Fe |
| 1 | 100.0 $FeCl_3$ | 0.940 | ~1.0 | 25 | 1.0 | 0.094 | [1] 0.094 | 50.2 | 3.2 |
| 2 | 150.0 iron chelate [a] | 0.779 | ~1.2 | 24 | 2.0 | 0.048 | 0.79 | 78.1 | 0 |
| 3 | ----do.[a]---- | 0.633 | 5.5 | 26 | 4.0 | 0.048 | 0.79 | 100.0 | 93.4 |
| 4 | ----do.[b]---- | 0.628 | 8.5 | 30 | 3.0 | 0.048 | 0.79 | 97.7 | 97.0 |
| 5-A | ----do.[b]---- | 0.916 | 7.9 | 100 | 1.0 | [2] 0.048 | 0 | 99.0 | |
| 5-B | ----do.[b]---- | | | 100 | 1.0 | 0 | 0.79 | | 99.0 |
| 6 | 150.0 chelating agent [c] | 0 | 12.65 | 27.0 | 4.0 | 0.048 | 0.79 | [d] 27.6 | 0 |

[a] Contains 1.7 g. Versene Fe-3 Specific/g. $Fe^{+3}$.
[b] Contains 2.9 g. Versene Fe-3 Specific/g. $Fe^{+3}$.
[c] Contains 35 g. Versene Fe-3 Specific.
[d] Sulfur as $H_2S$.
[1] As air.   [2] Cat. $C_3$ stream.

These results indicate the effectiveness of the instant invention in the removal of hydrogen sulfide from gaseous hydrocarbon streams and the recovery of sulfur from hydrogen sulfide and hydrogen sulfide-containing gaseous hydrocarbon streams. Run No. 1 shows that the utilization of an ordinary oxidation-reduction system results in low sulfur recovery and practically no regeneration of the reduced cation. Run Nos. 3 and 4 prove the effectiveness of the process of the instant invention whereby oxidation of the sulfide ion and regeneration of the reduced cation is accomplished simultaneously and thereby demonstrate the utility of the process. The effect of raising the pH on the regeneration reaction is also shown in run No. 4. Run Nos. 5-A and 5-B demonstrate a dual reactor process utilizing the instant invention wherein sulfur recovery and regeneration are quantitative. Run No. 6 shows that the chelating agent alone has no oxidation-reduction properties but merely absorbs some $H_2S$ as a result of its basicity and hence must be used in conjunction with a metallic cation. A comparison of runs 2 and 3 with runs 4, 5-A and 5-B demonstrates the preferred pH range of the metal-chelate solution.

We claim:

A continuous process for the quantitative production of elemental sulfur from a hydrogen sulfide-containing gaseous hydrocarbon stream which comprises mixing an aqueous solution of a compound selected from the group consisting of ferric chloride and ferric nitrate with an aqueous solution of the sodium salt of N,N-dihydroxyethylglycine to form an aqueous iron-chelate solution, concurrently introducing said hydrocarbon stream and a free-oxygen containing gas into said aqueous iron-chelate solution at a pH in excess of 7 and ranging up to about 10 and recovering elemental sulfur.

References Cited in the file of this patent
UNITED STATES PATENTS 1,847,795   Thorssell et al. _____ Mar. 1, 1932
1,854,847   Kuhn _____ Apr. 19, 1932

OTHER REFERENCES

Lowy et al.: An Introduction to Organic Chemistry, Seventh Edition (1951), John Wiley & Sons, Inc., page 400.

Martell et al.: "Chemistry of the Metal Chelate Compounds," Prentice-Hall Inc. (1952), pages 471–472.